United States Patent
Mizes et al.

(10) Patent No.: US 9,946,936 B2
(45) Date of Patent: Apr. 17, 2018

(54) AUTOMATED VIDEO BASED INGRESS/EGRESS SENSOR RESET FOR TRUCK STOP OCCUPANCY DETECTION

(71) Applicant: Xerox Corporation, Norwalk, CT (US)

(72) Inventors: Howard A. Mizes, Pittsford, NY (US); Rakesh S. Kulkarni, Webster, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 104 days.

(21) Appl. No.: 15/096,483

(22) Filed: Apr. 12, 2016

(65) Prior Publication Data
US 2017/0293807 A1    Oct. 12, 2017

(51) Int. Cl.
| G06K 9/00 | (2006.01) |
| G06K 9/62 | (2006.01) |
| H04N 7/18 | (2006.01) |
| G06K 9/32 | (2006.01) |

(52) U.S. Cl.
CPC ..... G06K 9/00785 (2013.01); G06K 9/00718 (2013.01); G06K 9/3233 (2013.01); G06K 9/6269 (2013.01); G06K 9/6284 (2013.01); H04N 7/181 (2013.01); G06K 9/00812 (2013.01); G06T 2207/30264 (2013.01)

(58) Field of Classification Search
CPC .......... G06K 9/00785; G06K 9/00718; G06K 9/3233; G06K 9/6269; G06K 9/6284; G06K 9/00812; G06T 2207/30264; H04N 7/181
See application file for complete search history.

(56) References Cited

U.S. PATENT DOCUMENTS

| 6,426,708 | B1* | 7/2002 | Trajkovic | ................ G08G 1/14 340/932.2 |
| 8,139,115 | B2 | 3/2012 | Barnes et al. | |
| 8,610,597 | B2 | 12/2013 | Stefik et al. | |
| 8,982,213 | B2 | 3/2015 | Nerayoff et al. | |
| 2009/0303079 | A1* | 12/2009 | Khim | .................... G08G 1/065 340/932.2 |

(Continued)

OTHER PUBLICATIONS

Cook et al. "An Automated System for Persistent Real-Time Truck Parking Detection and Information Dissemination." IEEE International Conference on Robotics and Automation, May 31, 2014, pp. 3989-3994.*

(Continued)

*Primary Examiner* — Jon Chang
(74) *Attorney, Agent, or Firm* — Kevin Soules; Luis M. Ortiz; Kermit D. Lopez

(57) ABSTRACT

A method and system for parking occupancy detection comprises collecting video of the parking facility with a video capturing device, counting an occupancy of a parking facility using at least one sensor to establish a sensor occupancy count, classifying each of a plurality of parking spots as occupied or vacant with a classifier according to the classification threshold in order to establish a video occupancy count, determining a difference between the sensor occupancy count and the video occupancy count, and setting the sensor occupancy count to equal the video occupancy count if the difference between the sensor occupancy count and the video occupancy count exceeds a difference threshold.

20 Claims, 11 Drawing Sheets

(56) References Cited

U.S. PATENT DOCUMENTS

| | | | |
|---|---|---|---|
| 2013/0258107 A1* | 10/2013 | Delibaltov | G06K 9/00785 348/148 |
| 2014/0145862 A1* | 5/2014 | Wang | G08G 1/141 340/932.2 |
| 2014/0214499 A1 | 7/2014 | Hudson et al. | |
| 2015/0016669 A1* | 1/2015 | Tabb | G06K 9/0063 382/103 |
| 2015/0043771 A1* | 2/2015 | Wu | G06K 9/00785 382/103 |
| 2015/0086071 A1 | 3/2015 | Wu et al. | |
| 2016/0196747 A1* | 7/2016 | Tsyrklevich | G08G 1/143 701/532 |
| 2017/0061508 A1* | 3/2017 | Sen | G06Q 30/0284 |

OTHER PUBLICATIONS

Delibaltov et al. "Parking Lot Occupancy Determination from Lamp-post Camera Images." 16th International IEEE Conference on Intelligent Transportation Systems, Oct. 6, 2013, pp. 2387-2392.*

* cited by examiner

AUTOMATED VIDEO BASED INGRESS/EGRESS SENSOR RESET FOR TRUCK STOP OCCUPANCY DETECTION

FIELD OF THE INVENTION

Embodiments are generally related to the field of imaging and monitoring. Embodiments are also related to the field of cameras and data capture. Embodiments are further related to methods and systems for occupancy detection. Embodiments are also related to rest stop occupancy detection.

BACKGROUND

Rest stops are central to countrywide infrastructure. Rest stops have been built over many years at regular intervals along interstate highways. The purpose of these rest stops is to allow both passenger vehicles and trucks to take breaks as needed between the start of their travel and their destination.

Often rest stops typically have a separate parking area for commercial truck traffic. The parking needs of truck drivers is sometimes more stringent than the average motorist. Truck drivers are on a schedule to deliver their cargo. Federal requirements require truck drivers to take rests at regular intervals. Therefore, truck drivers would benefit from some insurance that a parking space is available at rest stops along their journey. Thus, a system to provide occupancy information for upcoming rest stops would allow truckers to better plan their schedule.

Prior art approaches mainly rely on manual counting. However, such a solution is impractical and inefficient. There are computer vision algorithms that can detect the presence or absence of a car or truck. These algorithms continue to improve, but all have some level of error where the algorithm will indicate a truck is present when one is not (false positive) or that no truck is present when one is (false negative). Therefore prior art attempts to count parking lot occupancy inherently include an error in the total occupancy and are not adequate to provide an occupancy count. Prior art in ground detection systems are similarly flawed. It is not uncommon for such prior art systems to inaccurately count the presence of a vehicle in a parking spot, also giving an error in the total occupancy. Prior art in ingress and egress systems are similarly flawed. It is not uncommon for such prior art systems to count single vehicles as multiple vehicles or count multiple vehicles as single vehicles, resulting in errors that compound as time increases.

Accordingly, a need in the art exists for improved systems and methods for accurately counting the vehicle occupancy of a facility as described herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for video collection.

It is another aspect of the disclosed embodiments to provide a method and system for parking occupancy detection.

It is yet another aspect of the disclosed embodiments to provide an enhanced method and system for automated video based ingress/egress sensor reset according to video detection for rest stop occupancy detection.

The aforementioned aspects and other objectives and advantages can now be achieved as described herein. A method and system for parking occupancy detection comprises collecting video of the parking facility with a video capturing device, counting an occupancy of a parking facility using at least one sensor to establish a sensor occupancy count, classifying each of a plurality of parking spots as occupied or vacant with a classifier according to the classification threshold in order to establish a video occupancy count, determining a difference between the sensor occupancy count and the video occupancy count, and setting the sensor occupancy count to equal the video occupancy count if the difference between the sensor occupancy count and the video occupancy count exceeds a difference threshold.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
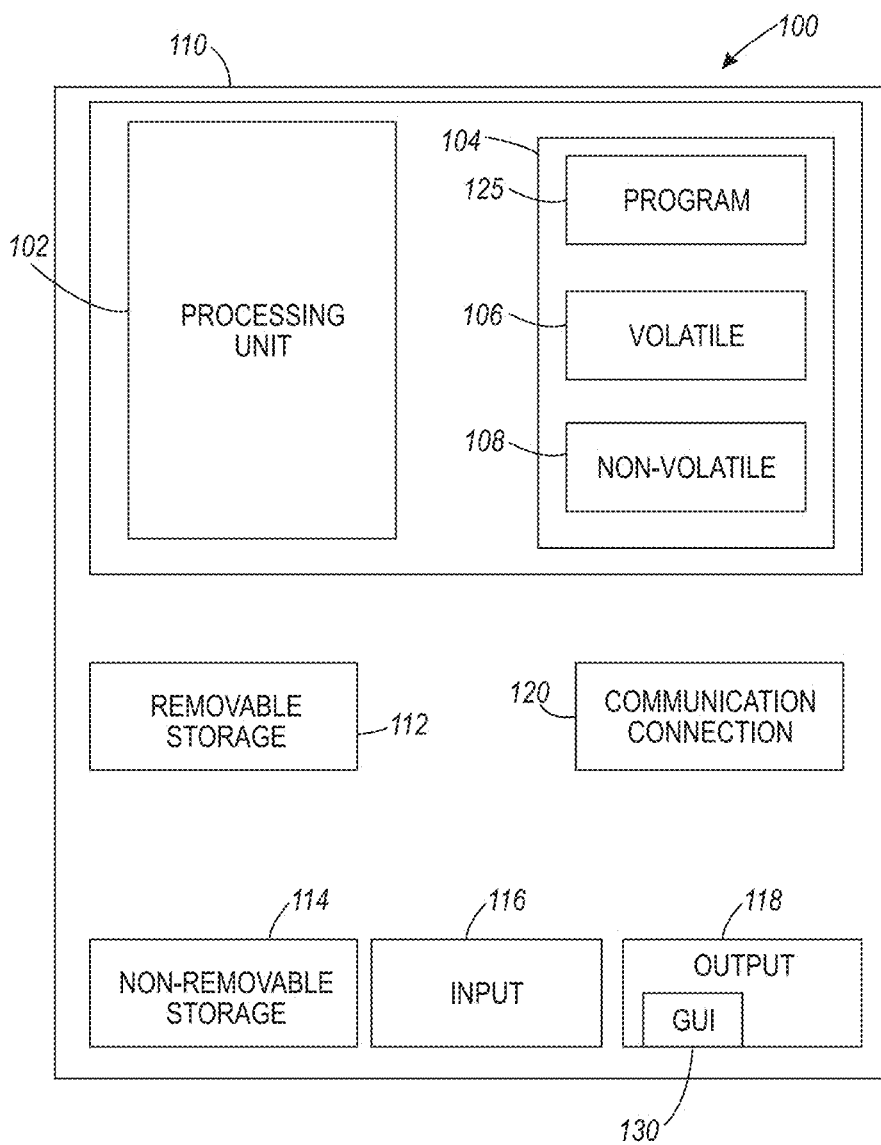
FIG. 1 depicts a block diagram of a computer system which is implemented in accordance with the disclosed embodiments.
Figure 2:
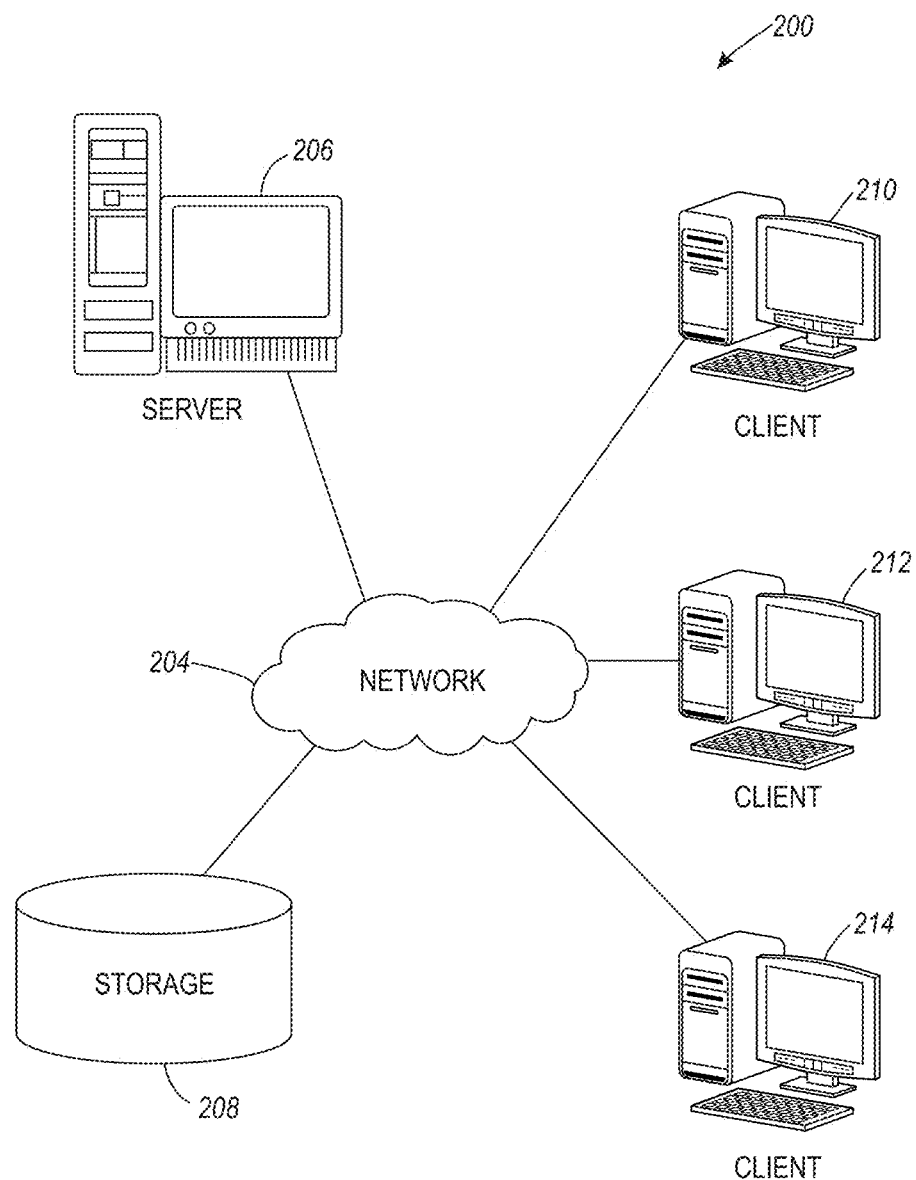
FIG. 2 depicts a graphical representation of a network of data-processing devices in which aspects of the present invention may be implemented.
Figure 3:
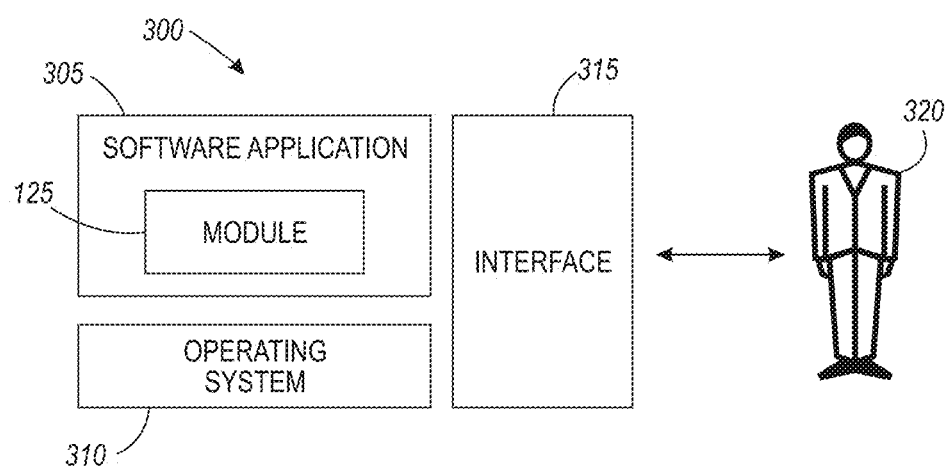
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 204 in communication with one or more clients 210, 212, and 214. Network 204 is a medium that can be used to provide communications links between various devices and computers connected together within a networked data processing system such as computer system 100. Network 204 may include connections such as wired communication links, wireless communication links, or fiber optic cables. Network 204 can further communicate with one or more servers 206, one or more external devices such as video camera, a sensor (such as an in-ground inductive vehicle detection sensor) and a memory storage unit such as, for example, memory or database 208.

In the depicted example, video camera and server 206 connect to network 204 along with storage unit 208. In addition, clients 210, 212, and 214 connect to network 204. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, sensor, etc.

Computer system 100 can also be implemented as a server such as server 206, depending upon design considerations. In the depicted example, server 206 provides data such as boot files, operating system images, applications, and application updates to clients 210, 212, and 214, and/or to video camera. Clients 210, 212, and 214 and video camera are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 204 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 204 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 6:
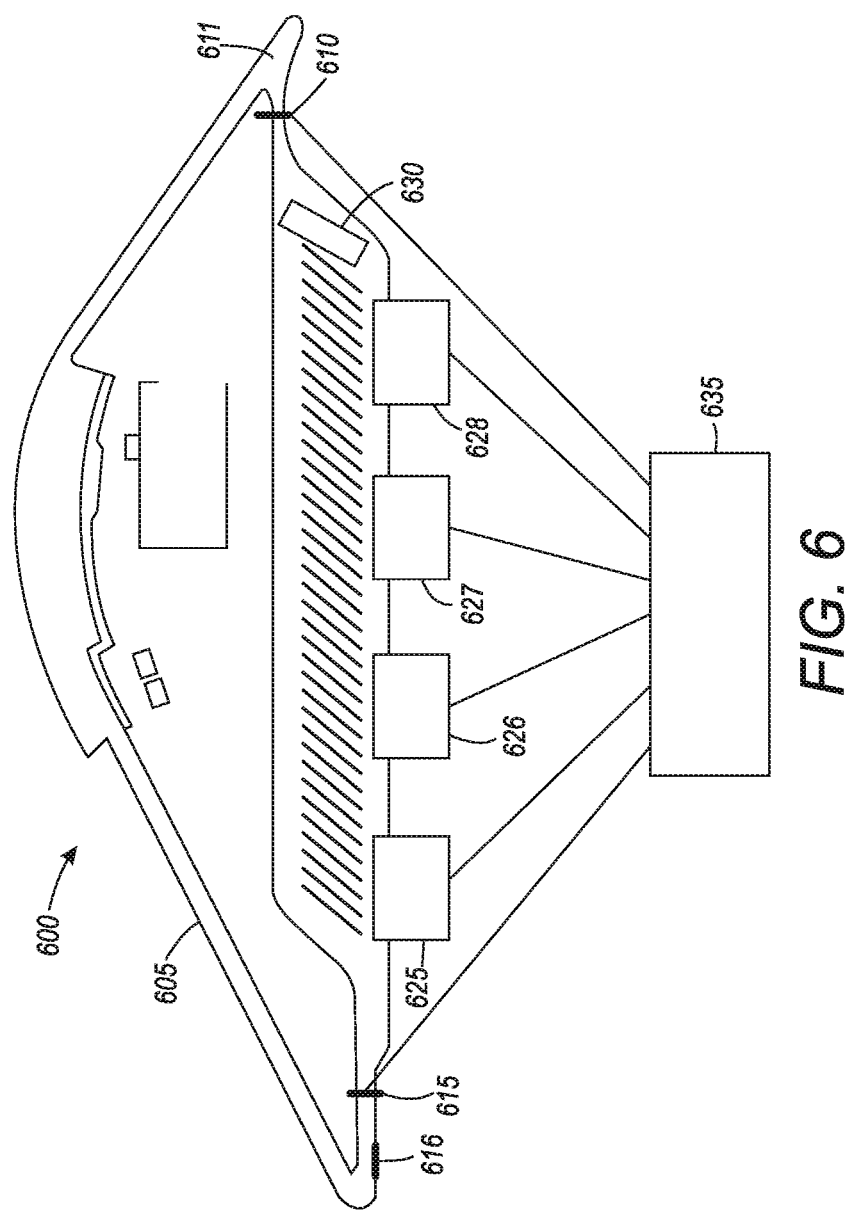
FIG. 6 depicts a block diagram of a system for detecting vehicle occupancy in accordance with disclosed embodiments.

FIG. 6 illustrates an embodiment of a system 600 for automated video based ingress/egress sensor reset, according to video detection, in order to determine vehicle occupancy. FIG. 6 illustrates a parking area 605 which includes a selection of demarcated parking spaces. There is an ingress sensor 610 at an entrance 611 to the parking facility 605 and an egress sensor 615 at the exit 616 of the parking facility 605. The ingress sensor 610 and egress sensor 615 can be embodied as in ground inductive loop sensors or other similar sensors.

The parking area is monitored by cameras 625-628. It should be appreciated that different applications may require different numbers of cameras. The ingress sensor 610 and egress sensor 615 may also be monitored by cameras. The field of view monitored by the cameras 625-628, in total, can cover all the parking spaces. Some overlap between the fields of view of the various cameras 625-628 may be necessary to adequately cover the parking spaces.

The ingress sensor 610, egress sensor 615, and cameras 625-628 may be connected to a computing device 635. The connection may be wired or wireless via a network architecture as shown in FIG. 2. The computing device 635 includes modules for accepting the input of the ingress sensor 610 and egress sensor 615 and logging or storing each entrance or exit of a vehicle. The modules are further configured to keep a running total of the vehicles in the parking spaces.

Induction loop sensors and other such in ground or above ground sensors are not perfect. For example, it is not uncommon for such sensors to count two trucks entering a parking facility at one time as a single truck. They may also count a single truck as two trucks. They may also not observe the entrance of a truck. Each time one of these sensing errors occurs there is an error in the occupancy count. Without correction, the error will accumulate over time. As such, the total occupancy of the parking area cannot be accurately known at all times using only such detectors.

Therefore, in the embodiments disclosed herein, the ingress sensor 610 and egress sensor 615 are supplemented by the set of cameras 625-628 that observe the parking spaces. At regular intervals, the video data of the parking spaces is observed and the computing device 635 or, a software module associated with computing device 635, can be used to count the vehicles, such as vehicle 630, in the parking spaces. Alternatively, a manual count of the vehicles according to the video data may be made. A log of this count may be stored in memory in the computing device 635.

Computer vision modules provided in computing system 635 can be used to detect the presence or absence of a vehicle. However, all such computer vision techniques have some level of error. For example, the computer vision application may indicate that a vehicle is present when there is no vehicle present (false positive), or may indicate there is no vehicle present when there is (false negative). Therefore, any video count of the parking spaces will also inherently include an error, and is thus not, by itself, adequate to provide an occupancy count.

In the most basic embodiment, if the count according to the ingress/egress sensors 610 and 615 do not match the count provided by the cameras 625-628, then the ingress/egress sensor count is reset to the count made by the video cameras. In this way, the error between the actual occupancy and the occupancy predicted from the ingress/egress sensors is prevented from growing over time. The updated occupancy count can thus be provided to a traffic authority or motorist to alert them to the vacancy at the parking facility 605.

This most simple embodiment requires tight integration of the ingress/egress sensors and the video cameras. It also requires frequent monitoring of the video. As such, the embodiment provides an accurate accounting of parking availability at the expense of manpower or computer efficiency.

In another embodiment, the ingress/egress sensors 610 and 615 may be used as the primary counter and the video data provided by the video cameras 625-628 can be used to monitor, and correct for, the accumulation of errors.

In an embodiment, the ingress/egress counters can be used as the primary occupancy counter. In such an embodiment, every time the ingress sensor is triggered, a file is written and saved on computing device 635, which contains the response of the sensor, including a time stamp associated with the entrance of a vehicle. When the ingress sensor 610 is triggered, the sensor occupancy count increases by 1. Likewise when the egress sensor is triggered, a file is written and saved on computing device 635, which contains the response of the sensor, including a time stamp associated with the exit of a vehicle. When the egress sensor is triggered, the count is decreased by one.

This approach provides a change in parking space occupancy, but to obtain the absolute occupancy, a baseline count is required. The baseline count can be performed at any interval, preferably once a day, at a time of day when the lowest occupancy for the day is expected. The baseline count can be determined by viewing the feed of the four video cameras 625-628 that monitor the parking spaces. Without the baseline count provided by the cameras 625-628, the occupancy of the vehicle count provided by the ingress/egress sensors drifts towards higher occupancy. This change is false and is due to errors in the ingress/egress sensor.

However, the baseline count provided by the video cameras will also include error. As noted above, computer vision techniques used to detect vehicles for the baseline count are inherently inaccurate. Thus, a single measurement may not necessarily give the true occupancy in the parking facility. The baseline count will contain both false positives, where an empty space is assigned as occupied, and false negatives, where a space with a parked vehicle is assigned as being vacant. Empirically, if the computer vision algorithm is designed to give approximately the same rate of false positives as false negatives, then it is noteworthy that during high occupancy times, the video count underestimates the actual occupancy and during low occupancy times the video overestimates the actual occupancy.

This is a consequence of the fact that for an accurate count on average, the number of false positives must equal the number of false negatives. However, at high occupancy times, there will generally be more false negatives than false positives because there are more vehicles parked and therefore an opportunity for more false negatives. Likewise at low occupancy times, there will generally be more false positives, than false negative because there are fewer vehicles parked and therefore an opportunity for more false positives.

To solve this problem, in one embodiment, an adjustment is necessary so that the number of false positives provided by the cameras 625-628 equals the number of false negatives at all occupancies. This requirement is stated mathematically by equation (1).

$$n_{vac} P(occ|vac) = n_{occ} P(vac|occ) \qquad (1)$$

$n_{occ}$ is the true number of spots occupied, $n_{vac}$ is the true number of spots vacant. P(vac|occ) is the probability of a false negative and P(occ|vac) is the probability of a false positive. Equation (1) can be rewritten as equation (2).

$$\frac{P(occ|vac)}{P(vac|occ)} = \frac{n_{occ}}{(n_{spot} - n_{occ})} \qquad (2)$$

where $n_{spot}$ is the number of parking spots in the parking facility.

For the classifiers associated with the computer vision module used for vehicle detection in the disclosed embodiments, there is an adjustable threshold which can be used to determine the tradeoff between making false positive errors and false negative errors. For example, in embodiments making use of a support vector machine (SVM) classifier, the threshold can be the distance from the decision boundary. For a random forest classifier, the threshold can be the number of trees voting for a positive response. The distance from the decision boundary or the number of trees voting for a positive response can be transformed into a score. In some instances, a score may range between zero and one, where a score closer to zero is more likely to be an unoccupied space and a score closer to one is more likely to be an occupied space.

In an embodiment, knowledge of the score for each detection instance can be used to generate a receiver operating characteristic (ROC) curve. An ROC curve is a data plot that illustrates the performance of a classifier as its discrimination threshold is varied. The plot illustrates the true positive rate against this false positive rate at various thresholds.

Using the ROC curve, a threshold which agrees with equation (2) can be determined for any occupancy. For example, if the left hand side of equation (2) is greater than the right hand side for a certain threshold (meaning that false positives were favored), the threshold for classifying a space as occupied could be raised.

In many cases it is very difficult to get a good estimate of a total count and this approach is not available. However, in the embodiments disclosed herein the ingress/egress sensor count gives a good estimate of occupancy. Thus, the ingress/egress sensor count can be used to set the ratio of making a false positive error to false negative error using equation (2). On average, the occupancy estimate from the video cameras will be correct.

Figure 7A:
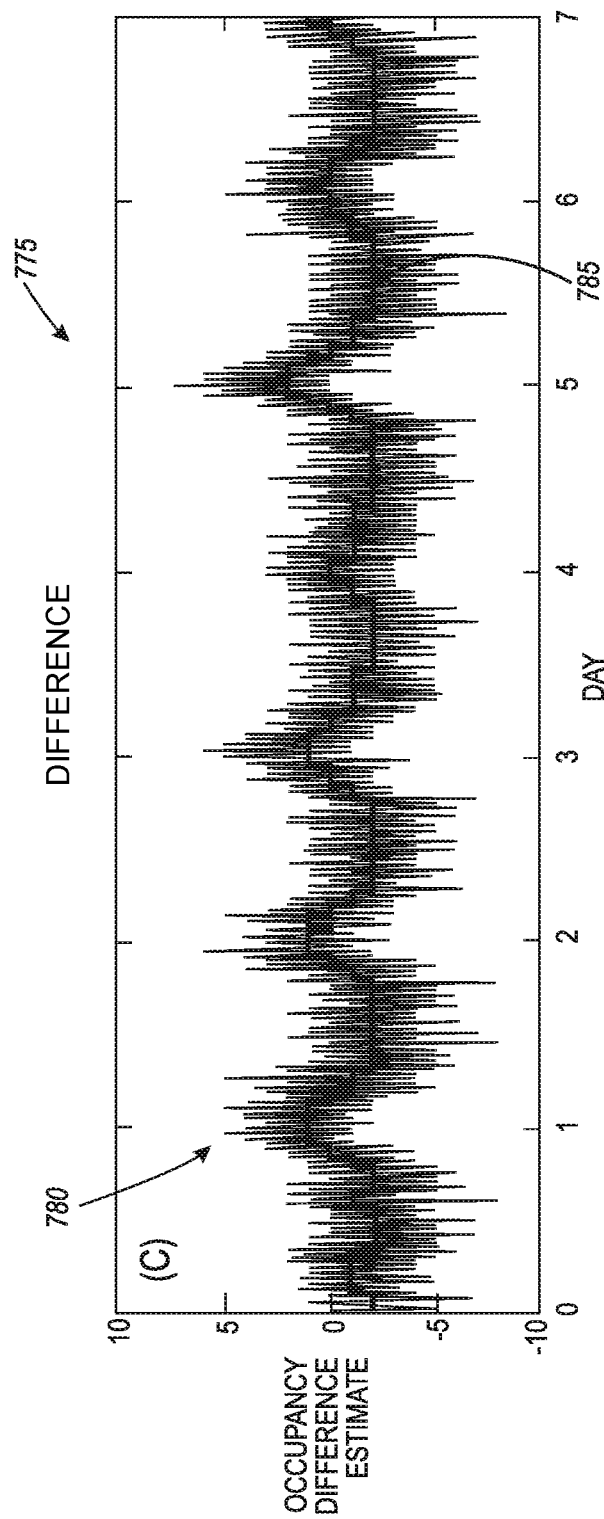
FIG. 7A depicts a chart without a threshold adjustment used in a parking space occupancy simulation in accordance with the disclosed embodiments.

An experimental implementation that does not include a threshold adjustment used in a parking space occupancy simulation is shown in plot 775 in FIG. 7A FIG. 7A illustrates the difference between the video estimate and the true occupancy. The curve 780 shows the by-minute difference and the curve 785 shows the difference averaged over an hour. When there is no adjustment of the threshold, then the estimate of the occupancy from the computer vision algorithm depends on the total occupancy. Specifically, the computer vision algorithm underestimates the occupancy at night when the occupancy is high (a positive direction in the ground truth and video estimate) and overestimates the occupancy during the day when the occupancy is low (a negative direction).

Figure 7B:
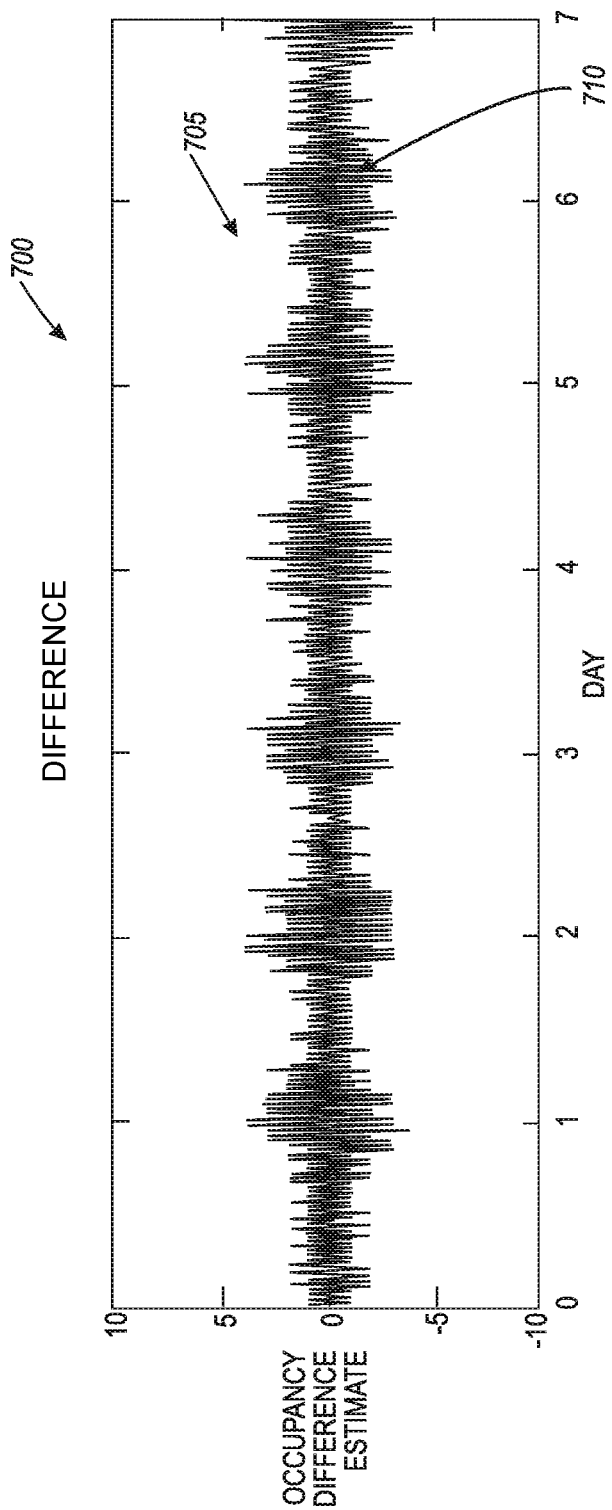
FIG. 7B depicts a chart of an occupancy difference estimate used in a parking space occupancy simulation in accordance with the disclosed embodiments.

An experimental implementation that does include a threshold adjustment used in a parking space occupancy simulation is shown in plot 700 in FIG. 7B. FIG. 7B illustrates the difference between the video estimate and true occupancy. The curve 705 shows the by-minute difference and the white curve 710 shows the difference averaged over an hour. When the threshold is adjusted to keep match the average occupancy, the by hour estimate is exactly correct independent of the total occupancy of the parking area Plot 700 only illustrates an experimental implementation of the occupancy dependent threshold when the actual occupancy is known. In the methods and system disclosed herein, the ingress/egress sensor will accumulate an error and the purpose of the video count is to reset the counter.

Figure 7C:
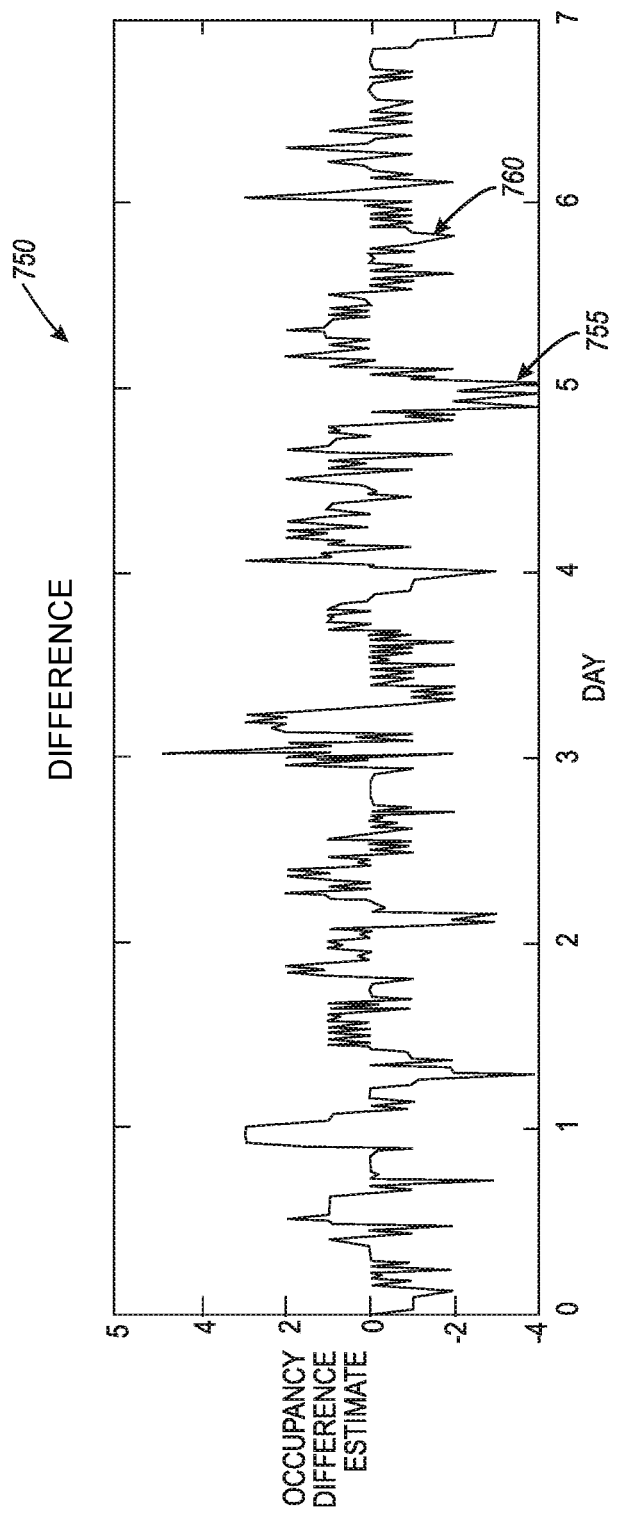
FIG. 7C depicts a frontal view of a chart of an occupancy difference estimate used in a parking space occupancy simulation in accordance with aspects of the disclosed embodiments.

FIG. 7C illustrates a plot 750 where an error in the simulation is introduced by forcing a miscount in the sensor. With a probability of 0.005, both the ingress sensor and the egress sensor counted a single truck as either 0 trucks or two trucks. Plot 750 shows the results of this second simulation. The curve plots the by-minute difference between the ingress/egress sensor and the video sensors. The smooth curve 755 is the by-hour average difference between the measurements. The curve 760 is the true ingress/egress. Note that for these simulation parameters, the true difference and the measured difference is nearly identical and always within a single vehicle. This is indicative of the fact that when the video count is used to reset the ingress/egress counter according to the embodiments disclosed herein, the reset will be accurate to a single truck.

In yet a further embodiment, it is necessary to account for the fact making a false negative error and a false positive error for two sequential analyses are often likely correlated. In the simulations illustrated in FIGS. 7B and 7C, it is assumed that a false negative error and a false positive error for two sequential analyses are independent of each other. In applications of the system that is not the case. An analysis of the video taken at prescribed intervals (for example, one minute apart) should be assumed to be highly correlated. That is to say, the same trucks are likely to be parked in the same spots and the same empty spaces are likely to be empty over short time intervals. As a consequence in one embodiment, the average must be taken over a longer time interval to arrive at a good estimate of the occupancy from the video data.

In an embodiment, solutions to this problem may involve the use of a preferable computer vision technique. For example, a computer vision technique using Histogram of Oriented Gradient (HOG) comprises creating a histogram of oriented gradient features of a region of interest surrounding each parking spot. The feature vector can represent a point in feature space. The feature space can be divided into two regions, occupied and vacant. This requires a machine learning stage in order to train the classifier. The HOG features will change if the image in the region of interest is slightly distorted by, for example, slightly rotating, translating, expanding, or contracting the image.

Therefore, in an embodiment of the systems and methods, the image of each vehicle can be distorted in a random way before it is classified in order to introduce more independence in the classification. This introduces a tendency for images of the same vehicle to be classified as a vehicle during some time interval (e.g., minutes) and as a vacant spot during other time intervals (e.g., minutes).

Figure 8:
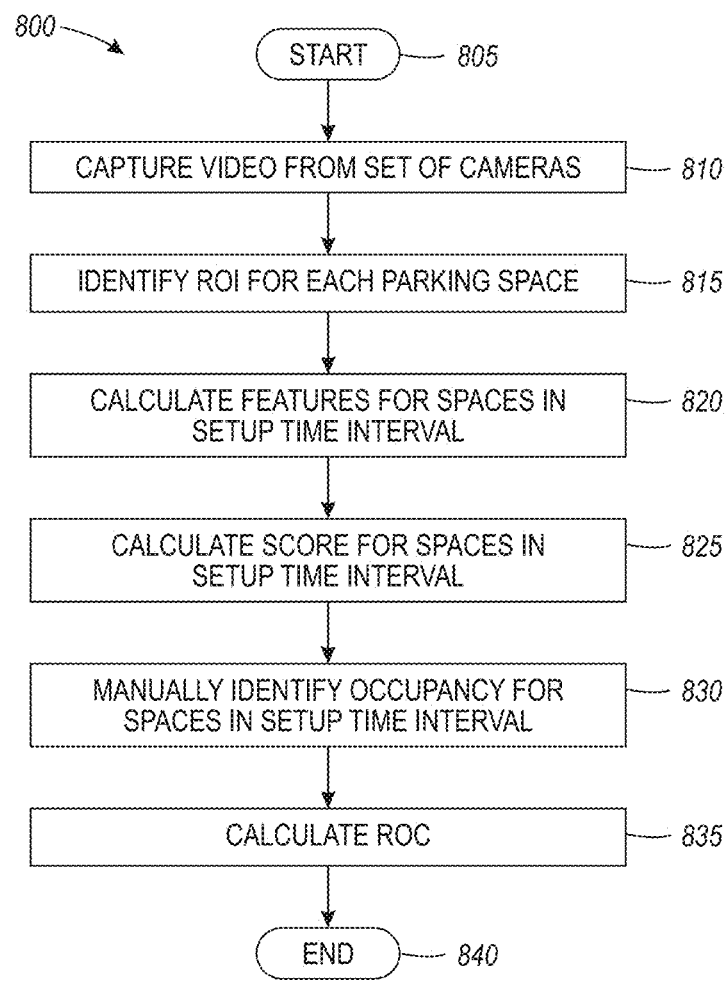
FIG. 8 depicts a flow chart illustrating steps in a method for video occupancy detection setup in accordance with the disclosed embodiments.

A flowchart 800 illustrating logical operation steps associated with video occupancy detection setup is provided in FIG. 8. The video occupancy detection setup can be used to define a region of interest (ROI) for each parking spot in the operational field of view of each camera monitoring the parking area. The video occupancy detection setup can also be used to define an ROC curve for each camera monitoring the parking area. The method begins at step 805.

The video occupancy detection setup method requires capturing video from the video cameras, or other such cameras, monitoring the parking facility as shown at step 810. The collected data may be video data or still image data and may be collected by a video camera, still camera, or other imaging device. The video is captured over a period of time which is the video occupancy detection setup time interval. The video occupancy detection setup time interval may be a week or other amount time depending on the specific application.

Figure 9:
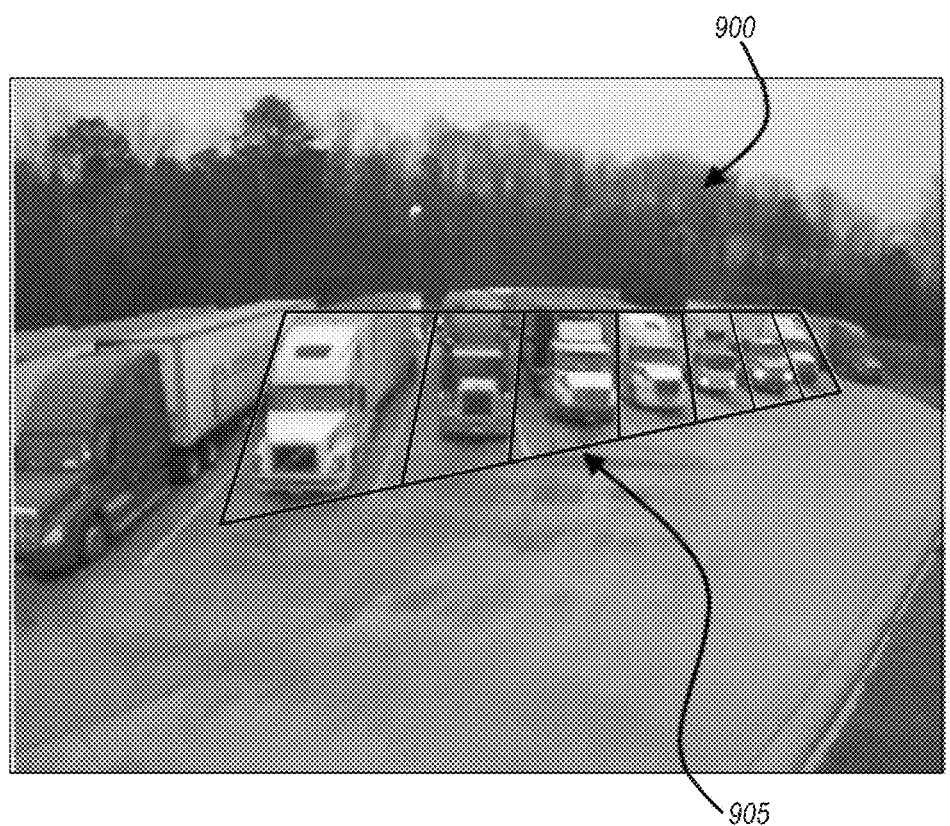
FIG. 9 depicts a flow chart illustrating steps in an ingress/egress reset method in accordance with the disclosed embodiments.

The method continues in step 815, where a region of interest (ROI) corresponding to each available parking space from the point of view of the camera is identified. For cameras positioned as shown in FIG. 6, the ROI encompasses the front of the truck when the space is occupied, and will view an empty parking space or the side of an adjacent truck when the spot is empty. In general, there may be other camera positions that may capture the side, back, or top of the trucks. One or more images from the video captured during the setup time interval is chosen to identify the ROI for each space. A preferred image is one in which most of the spaces are occupied. FIG. 9 provides an exemplary region of interest 900 as defined by lines 905.

The method continues to step 820, where a set of features is determined for each sequence of images for each parking space observed by each camera. These features could be HOG features, but they could alternatively be other features such as Speeded Up Robust Features (SURF), Local Binary Patterns (LBP), Haar wavelets, or color histograms. The interval between each sequence of images is preferably chosen so that one would expect a change in occupancy of at least one space between images from adjacent time intervals.

At step 825, a score $S_i(t_i)$ is assigned to each parking space for each image in the sequence according to the computer vision classification algorithm, where i is the index of the parking space and $t_i$ is the time of the image. The same sequence of images are manually reviewed in step 830, and each space in each image in the sequence is manually identified as occupied or vacant by assigning a value to $C_i(t_i)$, where $C_i(t_i)=1$ for an occupied space and 0 for a vacant space. From the knowledge of $S_i(t_i)$ and $C_i(t_i)$ for each camera, an ROC curve can be generated in step 835. The method ends at step 840.

Figure 4:
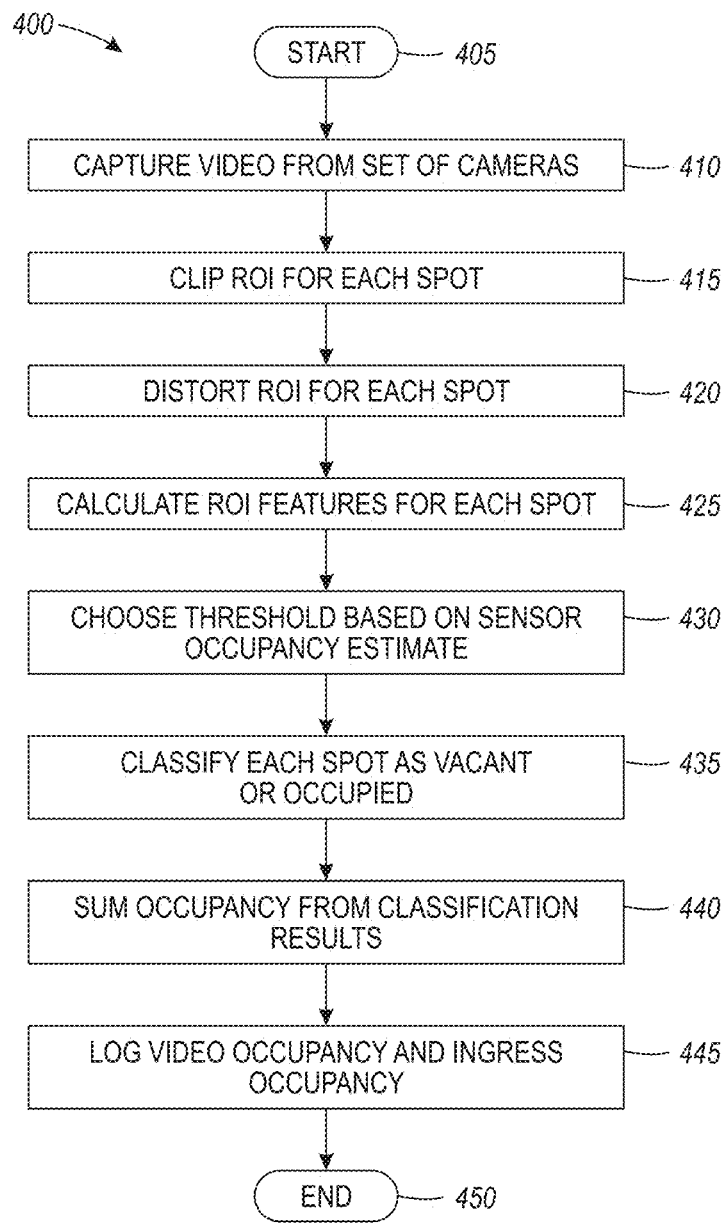
FIG. 4 depicts a flow chart illustrating logical operational steps for video occupancy detection in accordance with the disclosed embodiments.

A flowchart 400 illustrating logical operation steps associated with video occupancy detection is provided in FIG. 4. The video occupancy detection method can be used to convert video of the parking area to an unbiased estimate of the occupancy. The method begins at step 405.

The video occupancy detection method requires capturing video from the video cameras, or other such cameras, monitoring the parking facility as shown at step 410. The collected data may be video data or still image data and may be collected by a video camera, still camera, or other imaging device. The video data is ultimately used to confirm the current count of the ingress/egress sensor.

In some circumstance after a vehicle enters the parking facility, video data may be collected before it has parked. If such situations are rare, then video can be captured at regular intervals and events where vehicles are in transit are simply treated as errors in the count. If such situations are more common, then video capture video can be initiated when an ingress event has not occurred for some time T in the past, and an egress event will not occur for some time T in the future, where T is the maximum transit time from a parking space to the ingress/egress sensor.

The method continues in step 415, where a pre-identified region of interest (ROI) is extracted from the image of each camera that is viewing each parking space. For cameras as positioned in FIG. 6, the ROI encompasses the front of the truck when the space is occupied, and will view an empty parking space or the side of an adjacent truck when the spot is empty. In general, there may be other positions of the cameras that may capture the side, back, or top of the trucks. The ROI for each parking space can be manually defined during camera setup and remains the same throughout the use of the system barring any change in camera configuration or alignment. In such circumstances the ROI may require readjustment.

After a set of images, one for each parking space, is extracted, they are distorted in step 420. This distortion can include a combination of a rotation, translation, reflection, expansion, and/or contraction. As described above, the purpose of step 420 is to uncorrelate sequential captures of the same vehicle or of the same empty space, respectively.

The process continues to step 425, where a set of features is determined for each image of a single parking space. These images could be HOG features, but they could alternatively be other features such as Speeded Up Robust Features (SURF), Local Binary Patterns (LBP), Haar wavelets, or color histograms. A threshold can be chosen for the classification at step 430. The threshold that is selected will depend on current ingress/egress sensor estimate and knowledge of the ROC curve determined during camera setup. The ROC curve during camera set is determined by manually classifying a set of images as either occupied or vacant, and using the score of the computer vision algorithm. The threshold is selected so that equation (2) is satisfied.

At step 435, each parking spot in the parking facility is classified as either occupied or vacant according to the classification module associated with the computing device using the threshold determined in step 430. The occupancy is summed at step 440. $V_{occ}$, represents the summation and is an estimate of the occupancy of the entire parking facility. $V_{occ}$ as well as $V_{ie}$ (the estimate of occupancy from the ingress/egress sensors) are appended to the stored list of previous occupancy measurements and logged at step 445. The stored list of occupancy estimates of both the video sensor and the ingress/egress sensors can be used by the Ingress/egress reset process illustrated in FIG. 5. The method ends at step 450.

The video occupancy detection method 400 can be run at regular intervals. For parking facilities such as truck stops, rest stops, etc., an interval of one minute can provide a sufficient number of measurements for the ingress/egress reset process. As mentioned with respect to step 410, this time can be adjusted to ensure it runs when no vehicles are in transit.

Figure 5:
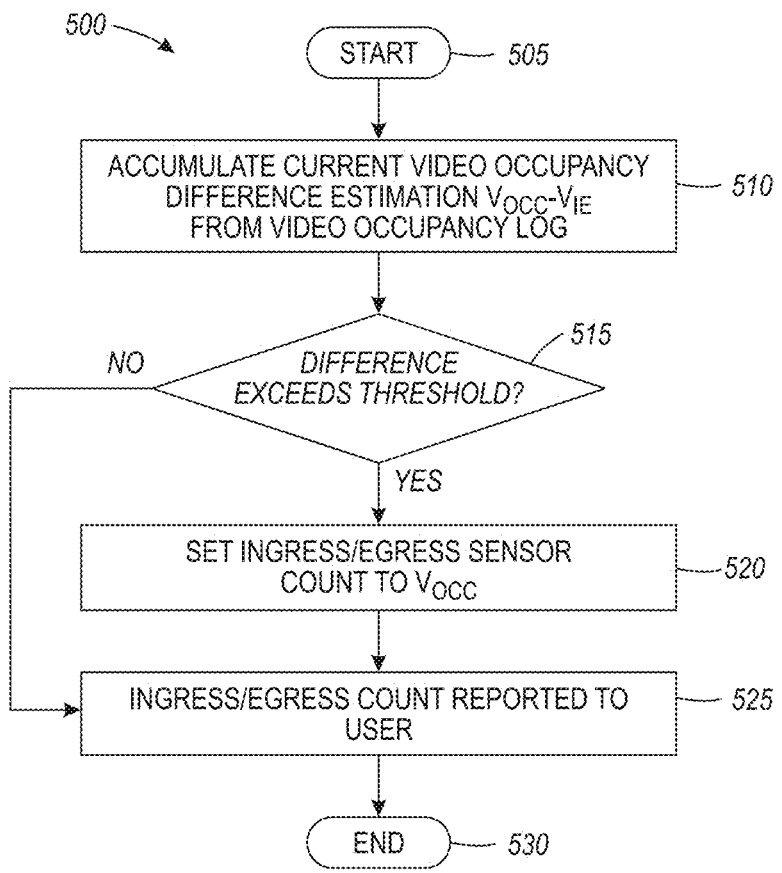
FIG. 5 depicts a flow chart illustrating steps in an Ingress/egress reset method in accordance with the disclosed embodiments.

FIG. 5 illustrates a method 500 for ingress/egress sensor reset in accordance with the disclosed embodiments. The method 500 is used to determine when the ingress/egress sensor count becomes inconsistent with the video estimate and should be reset. The method begins at step 505.

A module, for example, associated with a computing system 635 reads the occupancy log that is generated in step 445 of method 400, and then calculates the difference between $V_{occ}$ and $V_{IE}$ as shown at step 510. This difference is averaged over some time interval $\Delta T_{acc}$, which is preferably larger than the time increments for which the occupancy is logged. Averaging over intervals of one hour may be sufficient to minimize the noise, although longer intervals may be necessary if the correlation between sequential readings is not completely eliminated with the distortion performed in step 420 of method 400.

If the accumulated difference between $V_{occ}$ and $V_{IE}$ is zero, then the ingress/egress sensor is correct in its estimation of occupancy. If however, the ingress/egress sensor estimation has some errors, then the difference between $V_{occ}$ and $V_{IE}$ will be non-zero. At step 515, the difference between $V_{occ}$ and $V_{IE}$ is compared to a user defined threshold. The threshold is selected to be the maximum occupancy error that is acceptable to the system given its specific application. In some cases, the threshold may be set to require near perfect occupancy detection (i.e., the difference between $V_{occ}$ and $V_{IE}$ is a very low number). In other cases, the acceptable maximum occupancy error may be higher if precise occupancy measurements are not required.

If the between $V_{occ}$ and $V_{IE}$ exceeds the threshold, then as shown at step 520, the ingress/egress sensor occupancy count is reset so that the accumulated difference estimation $V_{occ}-V_{IE}$ is equal to zero, and the ingress/egress count is reported to the user at step 525. In other words, the ingress/egress sensor occupancy count is set to the video estimation count. If the difference between $V_{occ}$ and $V_{IE}$ does not exceed the threshold, no action is required and the ingress/egress count is reported to the user at step 525. The method ends at step 530.

In the embodiments disclosed herein, ingress/egress sensors are used to give a current count of the occupancy of parking facilities, but the sensors are not completely accurate and their estimate of the count will drift over time. A video system can be provided using computer vision modules for vehicle recognition. The video system provides an estimate of the occupancy of each spot.

The present embodiments use a threshold for video detection that is dependent on occupancy so that the number of false positives is equal to the number of false negatives, independent of occupancy. As a result, the video estimates will approach the true occupancy as more measurements are made. The video data of vehicles and/or vacant parking spots can be distorted in the region of interest to introduce noise in the occupancy detection and increase the independence of sequential measurements. The embodiments make use of the estimated video count to check the ingress/egress sensor count. The ingress/egress sensor count is reset when discrepancies in the respective counts goes beyond an application specific threshold.

Based on the foregoing, it can be appreciated that a number of embodiments, preferred and alternative, are disclosed herein. For example, in one embodiment, a method for parking occupancy detection comprises: collecting video of the parking facility with a video capturing device; counting an occupancy of a parking facility using at least one sensor to establish a sensor occupancy count; classifying each of a plurality of parking spots as occupied or vacant with a classifier according to the classification threshold in order to establish a video occupancy count; determining a difference between the sensor occupancy count and the video occupancy count; and setting the sensor occupancy count according to the difference between the sensor occupancy count and the video occupancy count.

In another embodiment, classifying each of a plurality of parking spots as occupied or vacant further comprises identifying a region of interest for each of the plurality of parking spots, randomly distorting the region of interest for each of the plurality of parking spots, calculating region of interest features for each of the plurality of parking spots wherein the region of interest features indicate if the parking spot is occupied or vacant, and classifying each or the plurality of parking spots as occupied or vacant based on at least one value for the region of interest features compared to a classification threshold.

In another embodiment, the method further comprises assigning a classification threshold wherein the classification threshold is dependent on the sensor occupancy count. Assigning a classification threshold further comprises establishing an ROC curve for the parking facility, determining a current sensor occupancy count, and selecting a threshold value on the ROC curve associated with the current sensor occupancy count.

In another embodiment, the method further comprises logging the sensor occupancy count on a set time interval, logging the video occupancy count on the set time interval, and averaging the difference between the sensor occupancy counts and the video occupancy counts over a set time interval for each or the logged sensor occupancy counts and logged video occupancy counts.

In an embodiment, the classifier comprises a computer vision classifier comprising at least one of a support vector machine classifier and a random forest classifier. The at least one sensor comprises an ingress sensor configured at an entry to the parking facility and an egress sensor configured at an exit to the parking facility.

In another embodiment, establishing an ROC curve for the parking facility further comprises generating an independent ROC curve for each of the plurality of parking spots and generating an independent ROC curve for each of a plurality of video cameras comprising the video capturing device.

In another embodiment, a system for parking occupancy detection comprises: a video capturing device for collecting video of a parking facility; a sensor for counting an occupancy of a parking facility used to establish a sensor occupancy count; a processor and a computer-usable medium embodying computer code, the computer-usable medium being coupled to the processor, the computer code comprising non-transitory instruction media executable by the processor configured for classifying each of a plurality of parking spots as occupied or vacant with a classifier according to the classification threshold in order to establish a video occupancy count; determining a difference between the sensor occupancy count and the video occupancy count; and setting the sensor occupancy count according to the difference between the sensor occupancy count and the video occupancy count.

In another embodiment, classifying each of a plurality of parking spots as occupied or vacant further comprises: identifying a region of interest for each of the plurality of parking spots; randomly distorting the region of interest for each of the plurality of parking spots; calculating region of interest features for each of the plurality of parking spots wherein the region of interest features indicate if the parking spot is occupied or vacant; and classifying each or the plurality of parking spots as occupied or vacant based on at least one value for the region of interest features and a classification threshold.

In another embodiment, the computer code comprising non-transitory instruction media executable by the processor is further configured for assigning a classification threshold wherein the classification threshold is dependent on the sensor occupancy count.

Assigning a classification threshold further comprises establishing an ROC curve for the parking facility, determining a current sensor occupancy count, and selecting a threshold value on the ROC curve associated with the current sensor occupancy count.

In another embodiment, the computer code comprising non-transitory instruction media executable by the processor is further configured for: logging the sensor occupancy count on a set time interval; logging the video occupancy count on the set time interval; and averaging the difference between the sensor occupancy counts and the video occupancy counts over a set time interval for each or the logged sensor occupancy counts and logged video occupancy counts.

In another embodiment, the classifier comprises a computer vision classifier comprising at least one of a support vector machine classifier and a random forest classifier.

In another embodiment, the at least one sensor comprises an ingress sensor configured at an entry to the parking facility and an egress sensor configured at an exit to the parking facility.

In another embodiment, establishing an ROC curve for the parking facility further comprises generating an independent ROC curve for each of the plurality of parking spots and generating an independent ROC curve for each of a plurality of video cameras comprising the video capturing device.

In yet another embodiment, a method for parking occupancy detection comprising: collecting video of the parking facility with a video capturing device; assigning a classification threshold wherein the classification threshold is dependent on the sensor occupancy count; establishing an ROC curve for the parking facility; determining a current sensor occupancy count; counting an occupancy of a parking facility using at least one sensor to establish a sensor occupancy count; selecting a threshold value on the ROC curve associated with the current sensor occupancy count; classifying each of a plurality of parking spots as occupied or vacant with a classifier according to the classification threshold in order to establish a video occupancy count; determining a difference between the sensor occupancy count and the video occupancy count; and setting the sensor occupancy count according to the difference between the sensor occupancy count and the video occupancy count.

In another embodiment, classifying each of a plurality of parking spots as occupied or vacant further comprises: identifying a region of interest for each of the plurality of parking spots randomly distorting the region of interest for each of the plurality of parking spots; calculating region of interest features for each of the plurality of parking spots wherein the region of interest features indicate if the parking spot is occupied or vacant; and classifying each or the plurality of parking spots as occupied or vacant based on at least one value for the region of interest features and a classification threshold.

In another embodiment, the method further comprises logging the sensor occupancy count on a set time interval, logging the video occupancy count on the set time interval, and averaging the difference between the sensor occupancy counts and the video occupancy counts over a set time interval for each or the logged sensor occupancy counts and logged video occupancy counts.

In another embodiment, the at least one sensor comprises an ingress sensor configured at an entry to the parking facility and an egress sensor configured at an exit to the parking facility.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for parking occupancy detection comprising:
collecting video of a parking facility with a video camera;
counting an occupancy of said parking facility using at least one sensor to establish a sensor occupancy count;
classifying each of a plurality of parking spots as occupied or vacant with a classifier according to a classification threshold in order to establish a video occupancy count;
determining a difference between said sensor occupancy count and said video occupancy count; and
setting said sensor occupancy count according to said difference between said sensor occupancy count and said video occupancy count.

2. The method of claim 1 wherein classifying each of a plurality of parking spots as occupied or vacant further comprises:
identifying a region of interest for each of said plurality of parking spots;
randomly distorting said region of interest for each of said plurality of parking spots;
calculating region of interest features for each of said plurality of parking spots wherein said region of interest features indicate if said parking spot is occupied or vacant; and
classifying each or said plurality of parking spots as occupied or vacant based on at least one value for said region of interest features compared to a classification threshold.

3. The method of claim 1 further comprising:
assigning said classification threshold wherein said classification threshold is dependent on said sensor occupancy count.

4. The method of claim 3 wherein assigning a classification threshold further comprises:
establishing an ROC curve for said parking facility;
determining a current sensor occupancy count; and
selecting a threshold value on said ROC curve associated with said current sensor occupancy count.

5. The method of claim 1 further comprising:
logging said sensor occupancy count on a set time interval;
logging said video occupancy count on said set time interval; and
averaging said difference between said sensor occupancy counts and said video occupancy counts over a set time interval for each or said logged sensor occupancy counts and logged video occupancy counts.

6. The method of claim 1 wherein said classifier comprises a computer vision classifier comprising at least one of:
a support vector machine classifier; and
a random forest classifier.

7. The method of claim 1 wherein said at least one sensor comprises an ingress sensor configured at an entry to said parking facility and an egress sensor configured at an exit to said parking facility.

8. The method of claim 4 wherein establishing an ROC curve for said parking facility further comprises:
generating an independent ROC curve for each of said plurality of parking spots; and
generating an independent ROC curve for each of a plurality of video cameras.

9. A system for parking occupancy detection comprising:
a video camera for collecting video of a parking facility;
a sensor for counting an occupancy of said parking facility used to establish a sensor occupancy count;
a processor; and
a non-transitory computer-usable medium embodying computer code executable by said processor, said computer code configured for:
classifying each of a plurality of parking spots as occupied or vacant with a classifier according to a classification threshold in order to establish a video occupancy count;
determining a difference between said sensor occupancy count and said video occupancy count; and
setting said sensor occupancy count according to said difference between said sensor occupancy count and said video occupancy count.

10. The system of claim 9 wherein classifying each of a plurality of parking spots as occupied or vacant further comprises:
identifying a region of interest for each of said plurality of parking spots;
randomly distorting said region of interest for each of said plurality of parking spots;
calculating region of interest features for each of said plurality of parking spots wherein said region of interest features indicate if said parking spot is occupied or vacant; and
classifying each or said plurality of parking spots as occupied or vacant based on at least one value for said region of interest features and a classification threshold.

11. The system of claim 9 wherein said computer code is further configured for:
assigning said classification threshold wherein said classification threshold is dependent on said sensor occupancy count.

12. The system of claim 11 wherein assigning a classification threshold further comprises:
establishing an ROC curve for said parking facility;
determining a current sensor occupancy count; and
selecting a threshold value on said ROC curve associated with said current sensor occupancy count.

13. The system of claim 9 wherein said computer code is further configured for:
logging said sensor occupancy count on a set time interval;
logging said video occupancy count on said set time interval; and
averaging said difference between said sensor occupancy counts and said video occupancy counts over a set time interval for each or said logged sensor occupancy counts and logged video occupancy counts.

14. The system of claim 9 wherein said classifier comprises a computer vision classifier comprising at least one of:
a support vector machine classifier; and
a random forest classifier.

15. The system of claim 9 wherein said at least one sensor comprises an ingress sensor configured at an entry to said parking facility and an egress sensor configured at an exit to said parking facility.

16. The system of claim 12 wherein establishing an ROC curve for said parking facility further comprises:
generating an independent ROC curve for each of said plurality of parking spots; and
generating an independent ROC curve for each of a plurality of video cameras.

17. A method for parking occupancy detection comprising:
collecting video of a parking facility with a video camera;

counting an occupancy of said parking facility using at least one sensor to establish a sensor occupancy count;

assigning a classification threshold wherein said classification threshold is dependent on said sensor occupancy count;

establishing an ROC curve for said parking facility;

determining a current sensor occupancy count;

selecting a threshold value on said ROC curve associated with said current sensor occupancy count;

classifying each of a plurality of parking spots as occupied or vacant with a classifier according to said classification threshold in order to establish a video occupancy count;

determining a difference between said sensor occupancy count and said video occupancy count; and setting said sensor occupancy count according to said difference between said sensor occupancy count and said video occupancy count.

18. The method of claim 17 wherein classifying each of a plurality of parking spots as occupied or vacant further comprises:

identifying a region of interest for each of said plurality of parking spots;

randomly distorting said region of interest for each of said plurality of parking spots;

calculating region of interest features for each of said plurality of parking spots wherein said region of interest features indicate if said parking spot is occupied or vacant; and classifying each or said plurality of parking spots as occupied or vacant based on at least one value for said region of interest features and said classification threshold.

19. The method of claim 17 further comprising:

logging said sensor occupancy count on a set time interval;

logging said video occupancy count on said set time interval; and averaging said difference between said sensor occupancy counts and said video occupancy counts over a set time interval for each or said logged sensor occupancy counts and logged video occupancy counts.

20. The method of claim 17 wherein said at least one sensor comprises an ingress sensor configured at an entry to said parking facility and an egress sensor configured at an exit to said parking facility.

* * * * *